United States Patent [19]
Uemura

[11] Patent Number: 5,302,098
[45] Date of Patent: Apr. 12, 1994

[54] PCI RIM

[75] Inventor: Yoshiaki Uemura, Kobe, Japan

[73] Assignee: Sumitomo Rubber Industries, Ltd., Kobe, Japan

[21] Appl. No.: 977,839

[22] Filed: Nov. 17, 1992

[30] Foreign Application Priority Data

Nov. 21, 1991 [JP] Japan ................ 3-334009

[51] Int. Cl.$^5$ ............................. B29D 30/06
[52] U.S. Cl. .................................. 425/58.1
[58] Field of Search ......... 425/58.1, 36, 404, 445; 264/237

[56] References Cited

U.S. PATENT DOCUMENTS

| | | | |
|---|---|---|---|
| 2,992,671 | 7/1961 | Bracht | 152/540 |
| 3,195,179 | 7/1965 | Laube | 425/58.1 |
| 3,852,008 | 12/1974 | Shichman | 425/58.1 |
| 4,169,698 | 10/1979 | Turk et al. | 425/58.1 |

FOREIGN PATENT DOCUMENTS 2366940  5/1978  France .
2004508  4/1979  United Kingdom .

OTHER PUBLICATIONS

"1956 Year Book", 1956, The Tire & Rim Association Inc., Akron, Ohio, U.S.A.

*Primary Examiner*—Jay H. Woo
*Assistant Examiner*—James P. Mackey

[57] ABSTRACT

A PCI rim comprising a bead seat and a flange each engaging a tire bead of a tire T wherein flange radius of the flange is set in a range from 7.5 mm to 12 mm, flange height of the flange is set in a range from 14 mm to 25 mm, and bead seat radius of the bead seat is set in a range from 4.5 mm to 7.0 mm. The gap F in practical engagement can be significantly reduced compared with the case of a conventional PCI rim. This brings unified circumferential engagement of the tire T with the rim 9 for a practical vehicle so that FV can be inhibited to be significantly small. Further, vibration problems caused by tire rotation are prevented and the displacement of the rim for the practical vehicle can be reduced.

1 Claim, 5 Drawing Sheets

PCI RIM

BACKGROUND OF THE INVENTION

The present invention relates to a post cure inflation rim (hereinafter referred to as "PCI rim") for vehicles.

For carcass material of a tire, nylon, polyester or the like have widely been used. During tire production the temperature of a tire just after vulcanization is very high. So, if the tire is left as it is, heat contraction happens and the tire is significantly deformed.

In view of this problem, just after vulcanization and the temperature of a tire is still high, the tire is assembled with a PCI rim (different from one used in a practical vehicle) for holding and cooling the tire. A constant air pressure is applied to the assembly so that the deformation and the like are prevented.

FIG. 4 is an enlarged cross section of a main part showing a condition where a PCI rim m and a tire t are engaged with each other. As shown in FIG. 4, conventionally, a PCI rim has been designed so that flange radius $r_1$ is smaller (for example, 5 mm) and flange height $l_1$ is smaller (for example, 10.5 mm) in view of easy tire detachability, or wide applicability for PCI rims of different diameter.

However, in the case where a tire t just after vulcanization is assembled with the PCI rim m designed as mentioned above, the tire is assembled with a portion from clinched portion a to sidewall b being inclined in a direction of an arrow e. This is shown by a full line in FIG. 4. An imaginary line in FIG. 4 shows an ideal shape of an assembled tire without inclination.

For this reason, as shown in FIG. 5, when the tire t is assembled with a rim n for a practical vehicle, a wide gap f is formed between heel portion d of tire bead c and the rim n. This wide gap f makes the engagement between the tire t and the rim n for the practical vehicle non-uniform in a circumferential direction, and accordingly FV (Force Variation) is great. This results in the tire vibration in its rotation.

An object of the present invention is to solve the above-mentioned problem, namely to provide a PCI rim with which a gap between a heel portion of a tire and a rim for a practical vehicle can be narrowed.

SUMMARY OF THE INVENTION

According to the present invention there is provided a PCI rim comprising a bead seat and a flange each engaging a tire bead of a tire T wherein flange radius of the flange is set in a range from 7.5 mm to 12 mm, flange height of the flange is set in a range from 14 mm to 25 mm, and bead seat radius of the bead seat is set in a range from 4.5 mm to 7.0 mm.

With a PCI rim of the present invention, in a condition wherein a tire just after vulcanization is assembled with the rim, its clinched portion is prevented from being outwardly inclined.

When this tire is assembled with a rim for a practical vehicle, the gap between a tire bead and the rim is made smaller than in the case of a conventional one. Thanks to this, contact area between the rim for the practical vehicle and the tire bead is increased, and engagement of the tire with the rim is scarcely varied in a circumferential direction of the tire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

The present invention is explained below in detail with reference to the drawings.

Figure 1:
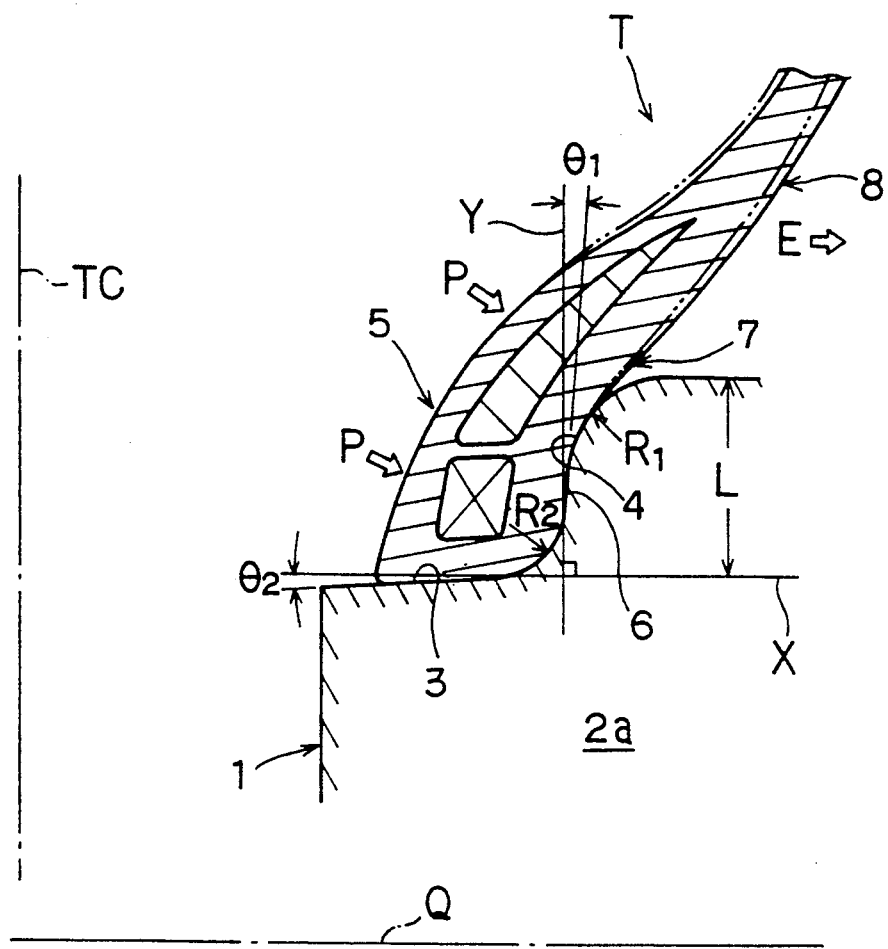
FIG. 1 is an enlarged cross section of a main part showing an embodiment of the present invention.
Figure 2:
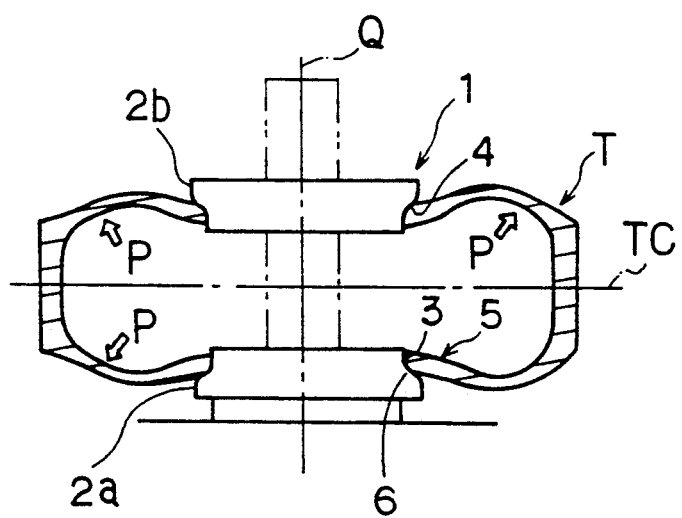
FIG. 2 is a cross section showing a condition wherein a tire is assembled with a PCI rim.

FIGS. 1 and 2 respectively show an embodiment of a PCI rim of the present invention. This PCI rim is provided with a pair of first and second disk-like rims 2a and 2b. In FIGS. 1 and 2, symbol Q represents a center axis of a tire T and a PCI rim 1, and symbol TC represents an equatorial plane of the tire T perpendicular to the axis Q.

On an outer circumferential surface of the first rim 2a, a sloped bead seat 3 and a curved flange 4 are arranged. The second rim 2b is also constructed similarly to the first rim 2a.

The tire T to be assembled with the rims 2a and 2b is one just after vulcanization and is so heated that, if it is left for cooling, heat contraction deforms the tire.

The tire bead 5 of the tire T is engaged with the bead seat 3 and the flange 4, and a constant air pressure is applied inside the tire T. Thus, internal pressure P allows a heel portion 6 of the tire bead 5 to closely contact with the bead seat 3 and the flange 4.

At this stage, as shown in FIG. 1, the tire T is in a condition wherein a region from a clinched portion 7 to a sidewall 8 is slightly inclined in a direction of an arrow E compared with a condition indicated by an imaginary line wherein the tire T is ideally shaped without inclination.

Thereafter, the tire T is cooled within a predetermined time period while being assembled on the PCI rim 1. Thus, significant deformation caused by heat contraction can be prevented and the tire T almost without deformation as shown in FIG. 1 is realized.

After the tire T is cooled, the internal pressure P is released and the tire T is taken out from the PCI rim 1.

Figure 3:
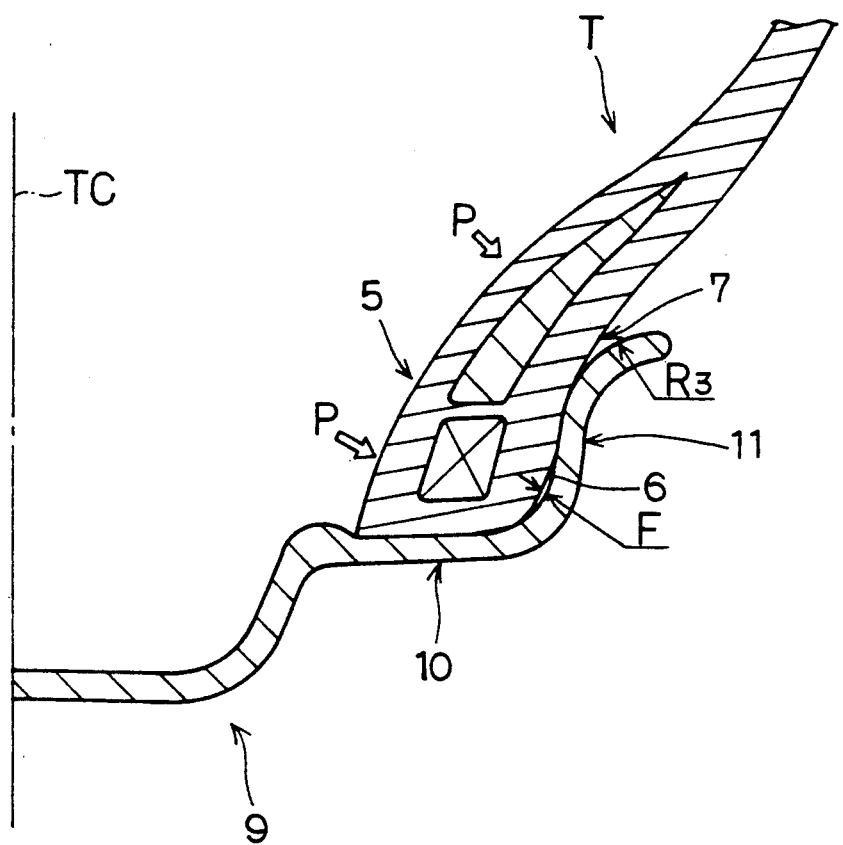
FIG. 3 is an enlarged cross section of a main part showing a condition wherein a tire is assembled with a rim for a practical vehicle.
Figure 4:
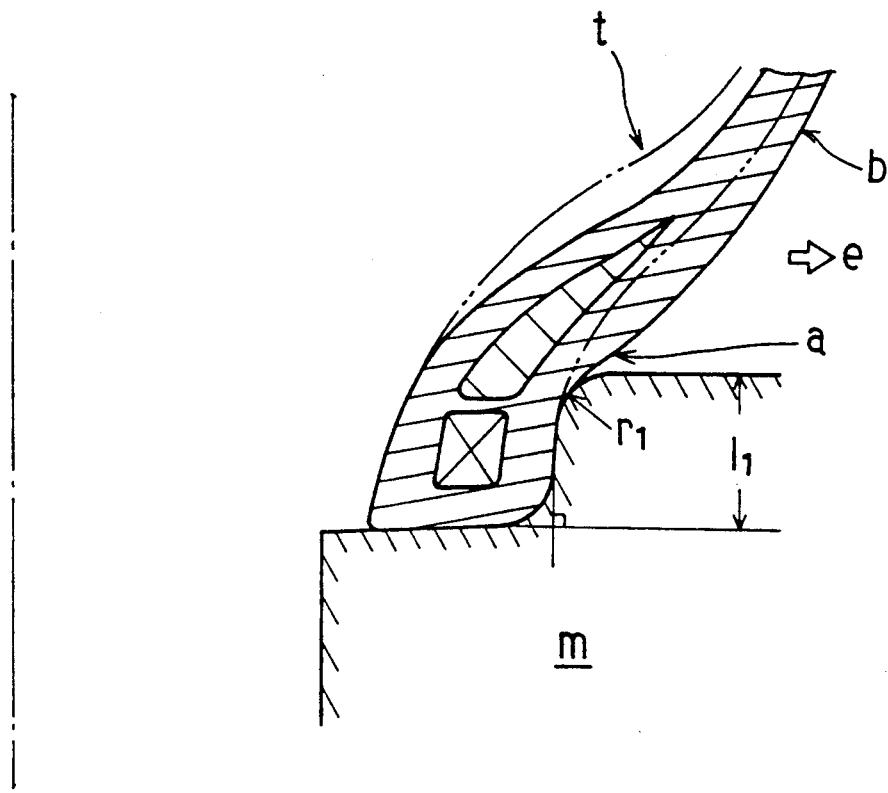
FIG. 4 is an enlarged cross section of a main part of a prior art.

FIG. 3 shows a condition wherein the tire T is assembled with a rim 9 for the practical vehicle. In this condition, the tire bead 5 of the tire T is assembled with a bead seat 10 and a flange 11 of the rim 9 for the practical vehicle. Internal pressure P of the tire T allows the tire T to fit thereto.

Symbol F represents a maximum gap between the flange 11 and the heel portion 6 of the tire bead 5.

In order to minimize the gap F, the inclination of the region from the clinched portion 7 to the sidewall 8 (shown in FIG. 1) in the direction of the arrow E must be inhibited by supporting the tire bead 5 with the flange 4. For this purpose, flange radius $R_1$, bead seat radius $R_2$ and flange height L must be respectively set in the following dimension ranges.

$7.5\ mm \leq R_1 \leq 12\ mm$     ①

$4.5\ mm \leq R_2 \leq 7.0\ mm$     ②

$14\ mm \leq L \leq 25\ mm$     ③

Flange angle $\theta_1$ and bead seat angle $\theta_2$ must be set in the following ranges. As to symbol X, it is a base line, indicating rim diameter, parallel with the axis Q. The base line X crosses perpendicularly to another base line Y.

$-2° \leq \theta_1 \leq 2°$     ④

$5° \leq \theta_2 \leq 20°$     ⑤

Figure 5:
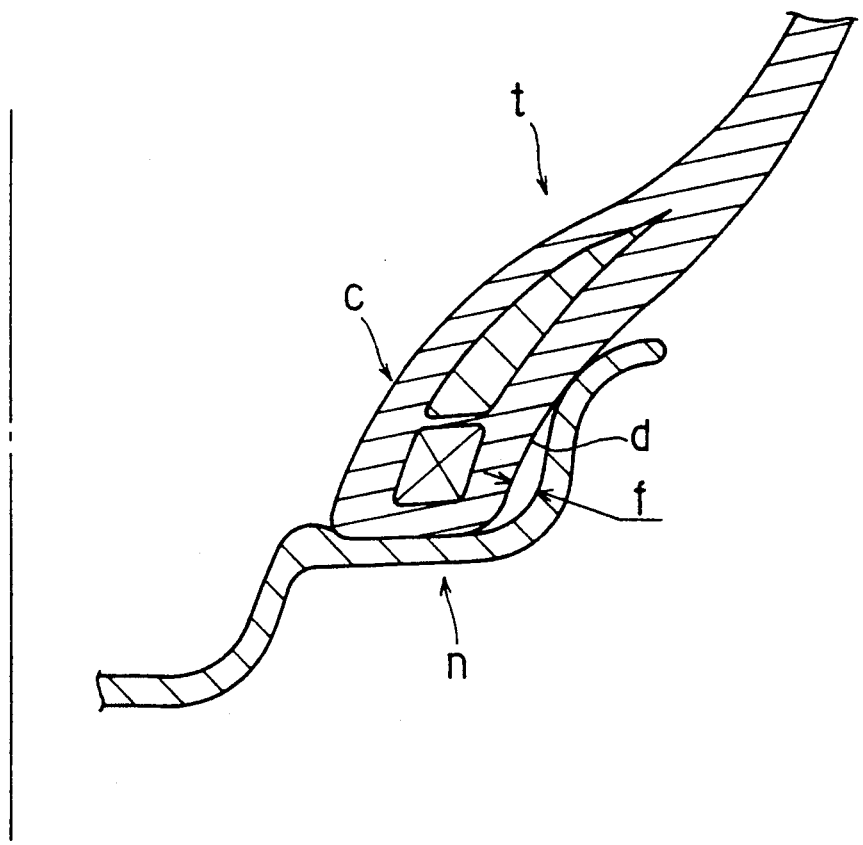
FIG. 5 is an enlarged cross section of a main part showing a condition wherein the tire shown in FIG. 4 is assembled with a rim for the practical vehicle.

Comparison data between gap F (brought by a PCI rim of the present invention) and gap f (refer to FIG. 5, brought by a conventional PCI rim), and comparison data between displacements of rim for the practical vehicle of two tires each having the gap F and the gap f are respectively shown in the following Tables 1 and 2 for different tire sizes. The displacement of the rim for the practical vehicle means a circumferential displacement of a tire relative to the rim for the practical vehicle which is brought when rapid acceleration and rapid breaking are repeated a predetermined times.

TABLE 1

| Comparison data for 195/70R14 tire size | | |
|---|---|---|
| | Conventional PCI rim | PCI rim of the present invention |
| Specification of PCI rim | | |
| $\theta_1$ | 2° | 0° |
| $\theta_2$ | 16° | 16° |
| $R_1$ | 16 mm | 9 mm |
| $R_2$ | 4 mm | 6 mm |
| L | 13.7 mm | 18.0 mm |
| Gap (f, F) | 1.0–1.3 mm | 0.3–0.5 mm |
| Displacement of rim for practical vehicle | 20–25 mm | 5–10 mm |

TABLE 2

| Comparison data for 205/65ZR15 tire size | | |
|---|---|---|
| | Conventional PCI rim | PCI rim of the present invention |
| Specification of PCI rim | | |
| $\theta_1$ | 0° | 0° |
| $\theta_2$ | 16° | 16° |
| $R_1$ | 5 mm | 9 mm |
| $R_2$ | 4 mm | 6 mm |
| L | 10.35 mm | 18.0 mm |
| Gap (f, F) | 1.0–1.5 mm | 0.5–0.7 mm |
| Displacement of rim for practical vehicle | 30–40 mm | 5–7 mm |

As is obvious from the Tables 1 and 2, in the present invention the gap F is about one-forth to one-half, and the displacement of the rim for the practical vehicle is about one-eighth to one-half compared with the prior art. Thus, in the present invention they are significantly reduced and kept at significantly low values.

As explained above, the gap F becomes smaller and contact area between the flange 11 of the rim 9 for practical vehicle and the tire bead 5 of the tire T is increased as shown in FIG. 3. This brings a unified circumferential engagement of the tire T with the rim 9 for the practical vehicle.

Setting the rim specification at the above-mentioned sizes ① to ③ brings the maximum effect of the present invention.

If the rim specification is out of the sizes ① to ⑤, the following problems arise.

As shown in FIGS. 1 and 3, if the flange radius $R_1$ is more than 12 mm, the radius $R_1$ is greatly different from the flange radius $R_3$ of the rim 9 for the practical vehicle, and if the flange radius $R_1$ is less than 7.5 mm, the inclination of the clinched portion 7 in the direction of the arrow E can scarcely be inhibited.

If the bead seat radius $R_2$ is more than 7 mm, the gap F is further increased, and if the bead seat radius $R_2$ is less than 4.5 mm, suitable contact with pressure between the tire bead 5 and the rim 9 for the practical vehicle can not be expected.

If the flange height L is more than 25 mm, the gap (not shown) formed between the clinched portion 7 and the flange 4 of the PCI rim when the tire T is assembled with the PCI rim is increased, and if the flange height L is less than 14 mm, the clinched portion 7 is further significantly inclined in the direction of the arrow E and this brings a further increase in the gap F.

If the flange angle $\theta_1$ is more than 2°, when the tire is assembled with the rim 9 for the practical vehicle, the clinched portion 7 contacts with the curved portion of radius $R_3$ too early. This increases an initial air trap volume. If the flange angle $\theta_1$ is less than $-2°$, rim chafing happens. Rim chafing is a phenomenon where the tire bead 5 and the flange 11 of the rim 9 chafe each other during practical running.

If the bead seat angle $\theta_2$ is more than 20° or the bead seat angle $\theta_2$ is less than 5°, the rim 9 can not satisfactorily accommodate the tire T so that unified circumferential engagement of the tire T with the PCI rim 1 can not be realized.

Since the present invention has the above-mentioned structure, the following significant effects can be obtained.

The gap F in practical engagement can be significantly reduced compared with the case of a conventional PCI rim. This brings unified circumferential engagement of the tire T with the rim 9 for the practical vehicle so that FV can be inhibited to be significantly small. Further, vibration problems caused by tire rotation are prevented and the displacement of the rim for the practical vehicle can be reduced. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A PCI rim comprising a bead seat and a flange each engaging with a tire bead of a tire wherein flange radius of the flange is set in a range from 7.5 mm to 12 mm, flange height of the flange is set in a range from 14 mm to 25 mm, and bead seat radius of the bead seat is set in a range from 4.5 mm to 7.0 mm.

* * * * *